(12) United States Patent
Xu

(10) Patent No.: US 12,379,565 B2
(45) Date of Patent: Aug. 5, 2025

(54) ZOOM LENS MODULE

(71) Applicant: AAC Optics (Nanning) Co., Ltd., Nanning (CN)

(72) Inventor: Tongming Xu, Shenzhen (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 571 days.

(21) Appl. No.: 17/840,650

(22) Filed: Jun. 15, 2022

(65) Prior Publication Data

US 2023/0266559 A1 Aug. 24, 2023

(30) Foreign Application Priority Data

Feb. 23, 2022 (CN) .......................... 202220383689.0

(51) Int. Cl.
*G02B 7/02* (2021.01)
*H02N 2/10* (2006.01)

(52) U.S. Cl.
CPC ............. *G02B 7/021* (2013.01); *H02N 2/103* (2013.01)

(58) Field of Classification Search
CPC .......... G02B 7/02; G02B 7/021; G02B 7/022; G02B 7/023; G02B 7/025; G02B 7/026; H02N 2/103
See application file for complete search history.

(56) References Cited

U.S. PATENT DOCUMENTS

2022/0210300 A1* 6/2022 Seo .................... H04N 23/51

* cited by examiner

*Primary Examiner* — Ephrem Z Mebrahtu
(74) *Attorney, Agent, or Firm* — Wiersch Law Group

(57) ABSTRACT

The present disclosure provides a zoom lens module, including a casing with an accommodation space, a first lens module arranged at a bottom end of the casing, a bracket arranged in the accommodation space and slidable relative to the casing, a second lens module fixed to the bracket, a third lens module arranged in the accommodation cavity and slidable relative to the bracket, a first driver fixed on the bracket and a second driver fixed on the third lens module. The first lens module, the second lens module, the third lens module are coaxially arranged. The first driver drives the bracket, the second lens module and the third lens module to move along a direction of an optical axis, and the second driver drives the third lens module to move along the direction of the optical axis. The present disclosure has a simple assembly, concise structure and small volume.

9 Claims, 5 Drawing Sheets

ZOOM LENS MODULE

TECHNICAL FIELD

The present disclosure relates to the technical field of electronic equipment, in particular to a zoom lens module.

BACKGROUND

With the advancement of modern video technologies, the requirements for the pixels and quality of the camera have become higher and higher in recent years. As one of the core components of the camera, the zoom lens is capable of making both far and near images clear. Usually, the zoom lens drives a relative movement of each lens group to change a focal length through an interaction between a coil and a magnet, but this method is expensive and complicated in structure.

Therefore, it is necessary to provide a new zoom lens module to solve the above-mentioned technical problem.

SUMMARY

An object of the present disclosure is to provide a zoom lens module with a simple structure and a small volume.

In order to achieve the above-mentioned object, the present disclosure provides a zoom lens module, comprising: a casing with an accommodation space, a first lens module arranged at a bottom end of the casing, a bracket arranged in the accommodation space and slidable relative to the casing, which surrounds an accommodation cavity, a second lens module fixed to the bracket, a third lens module arranged in the accommodation cavity and slidable relative to the bracket, a first driver fixed on the bracket and a second driver fixed on the third lens module; wherein the first lens module, the second lens module, the third lens module are coaxially arranged; the first lens module comprises a first lens barrel and a first lens group accommodated in the first lens barrel; the second lens module comprises a second lens barrel and a second lens group accommodated in the second lens barrel; the third lens module comprises a third lens barrel and a third lens group accommodated in the third lens barrel; the first driver drives the bracket, the second lens module and the third lens module to move along a direction of an optical axis, and the second driver drives the third lens module to move along the direction of the optical axis.

In some embodiments, the first driver and the second driver are piezoelectric motors.

In some embodiments, the first driver and the second driver are arranged on a same side of the zoom lens module.

In some embodiments, a first ball is provided between the casing and the bracket, and a second ball is provided between the bracket and the third lens barrel.

In some embodiments, a magnetic steel is fixed on the bracket, a first magnetic yoke is fixed on the casing, and a second magnetic yoke is fixed on the third lens barrel; an attractive force between the magnetic steel and the first magnetic yoke makes the first ball clamped between the casing and the bracket, and an attractive force between the magnetic steel and the second magnetic yoke makes the second ball clamped between the bracket and the third lens barrel.

In some embodiments, the casing comprises a bottom wall and a side wall extending from the bottom wall, and a buffer gasket is provided between the bottom wall and the second lens barrel, and/or a buffer gasket is provided between the second lens barrel and the third lens barrel.

In some embodiments, an inner wall of the casing is provided with a first protrusion portion protruding inward, an outer wall of the second lens barrel is provided with a first protrusion portion protruding outward, and the first protrusion portion and the second protrusion portion cooperate to limit a common upward movement distance between the second lens module and the third lens module.

In some embodiments, the bracket is provided with a third protrusion portion protruding inward, an outer wall of the third lens barrel is provided with a fourth protrusion portion protruding outward, and the third protrusion portion and the fourth protrusion portion cooperate to limit an upward movement distance of the third lens module.

In some embodiments, the zoom lens module further comprises: a first cover body fixed on a top of the bracket and moving with the bracket, and a second cover body fixed on a top of the third lens barrel and moving with the third lens barrel.

In some embodiments, the zoom lens module further comprises: a silicone gasket, comprising: a main body sandwiched between the bracket and the first cover part, a first extension portion extending from a side of the main body part close to the optical axis and fixed on the second cover body, and a second extension portion extending from a side of the main body part away from the optical axis and fixed on the casing.

Compared with the related art, the present disclosure provides a zoom lens module, including a casing with an accommodation space, a first lens module arranged at a bottom end of the casing, a bracket arranged in the accommodation space and slidable relative to the casing, which surrounds an accommodation cavity, a second lens module fixed to the bracket, a third lens module arranged in the accommodation cavity and slidable relative to the bracket, a first driver fixed on the bracket and a second driver fixed on the third lens module. The first lens module, the second lens module, the third lens module are coaxially arranged. The first lens module includes a first lens barrel and a first lens group accommodated in the first lens barrel. The second lens module includes a second lens barrel and a second lens group accommodated in the second lens barrel. The third lens module includes a third lens barrel and a third lens group accommodated in the third lens barrel. The first driver drives the bracket, the second lens module and the third lens module to move along a direction of an optical axis, and the second driver drives the third lens module to move along the direction of the optical axis. The zoom lens module of the present disclosure has a simple assembly, a concise structure and a small volume.

BRIEF DESCRIPTION OF THE DRAWINGS

In order to describe the technical solutions in the embodiments of the present disclosure more clearly, accompanying drawings required to be used in the descriptions of the embodiments will be briefly introduced below. Obviously, the drawings in the illustration below are merely some embodiments of the present disclosure. Those ordinarily skilled in the art also can acquire other drawings according to the provided drawings without doing creative work.

DETAILED DESCRIPTION OF THE EMBODIMENTS

Figure 1:
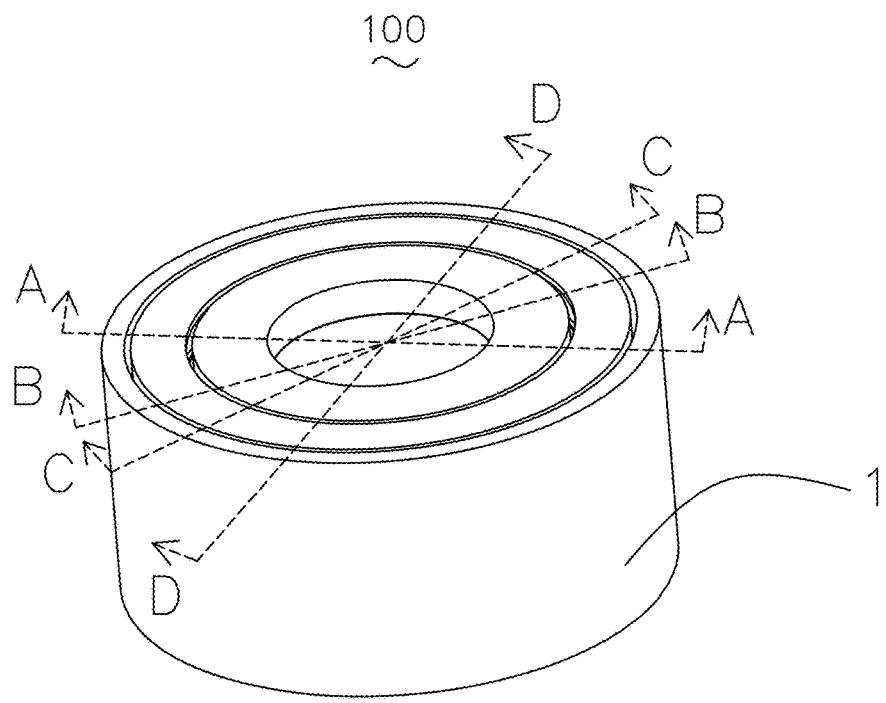
FIG. 1 is a three-dimensional view of a zoom lens module according to the present disclosure.
Figure 2:
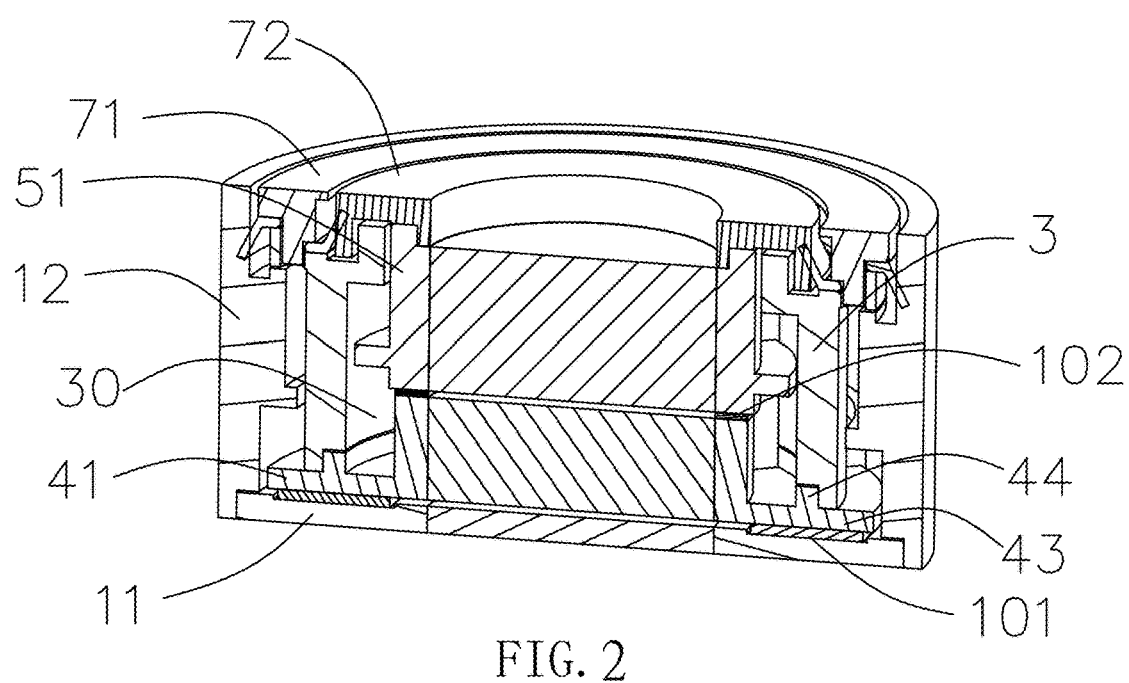
FIG. 2 is a sectional view along a line A-A in FIG. 1.
Figure 3:
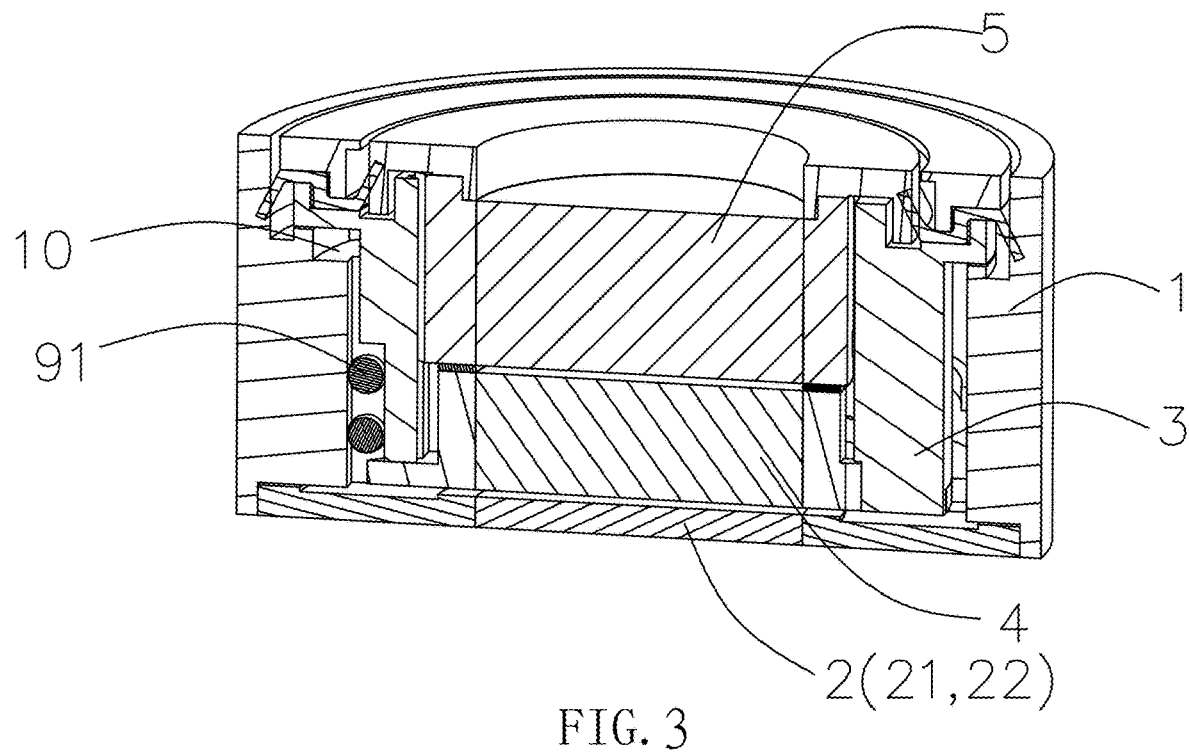
FIG. 3 is a sectional view along a line B-B in FIG. 1.
Figure 4:
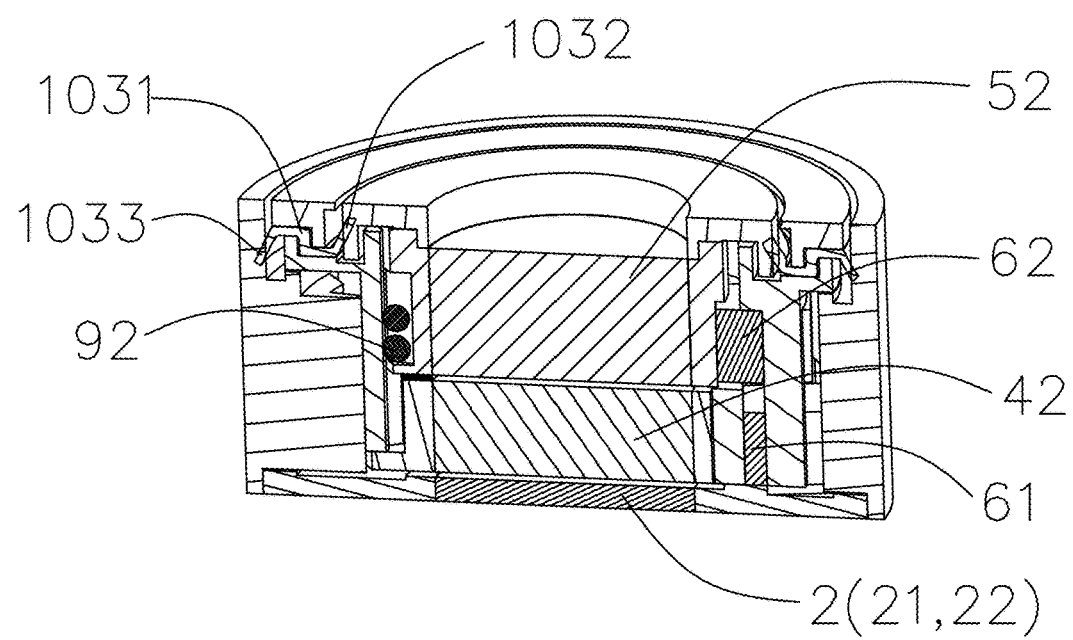
FIG. 4 is a sectional view along a line C-C in FIG. 1.
Figure 5:
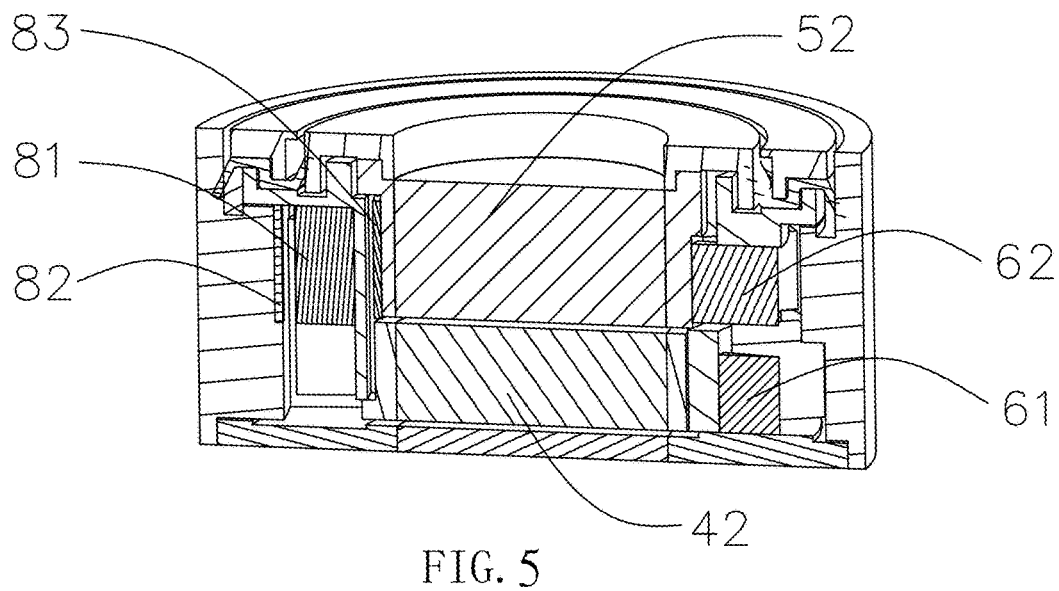
FIG. 5 is a sectional view along a D-D line in FIG. 1.
Figure 6:
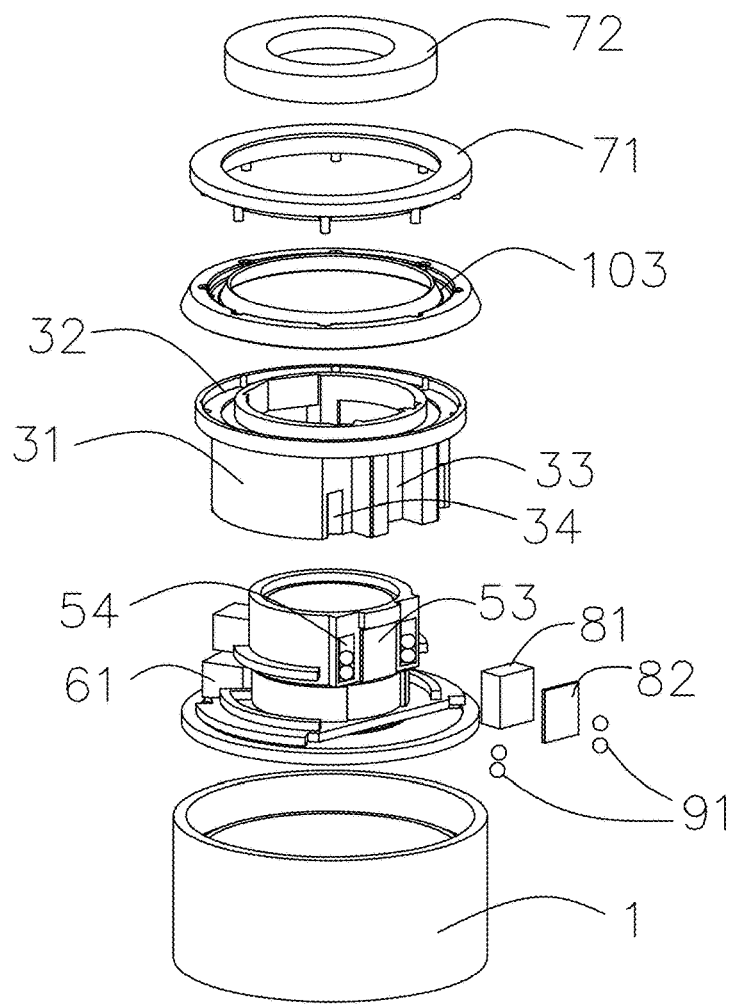
FIG. 6 is a partial exploded view of the zoom lens module shown in FIG. 1.
Figure 7:
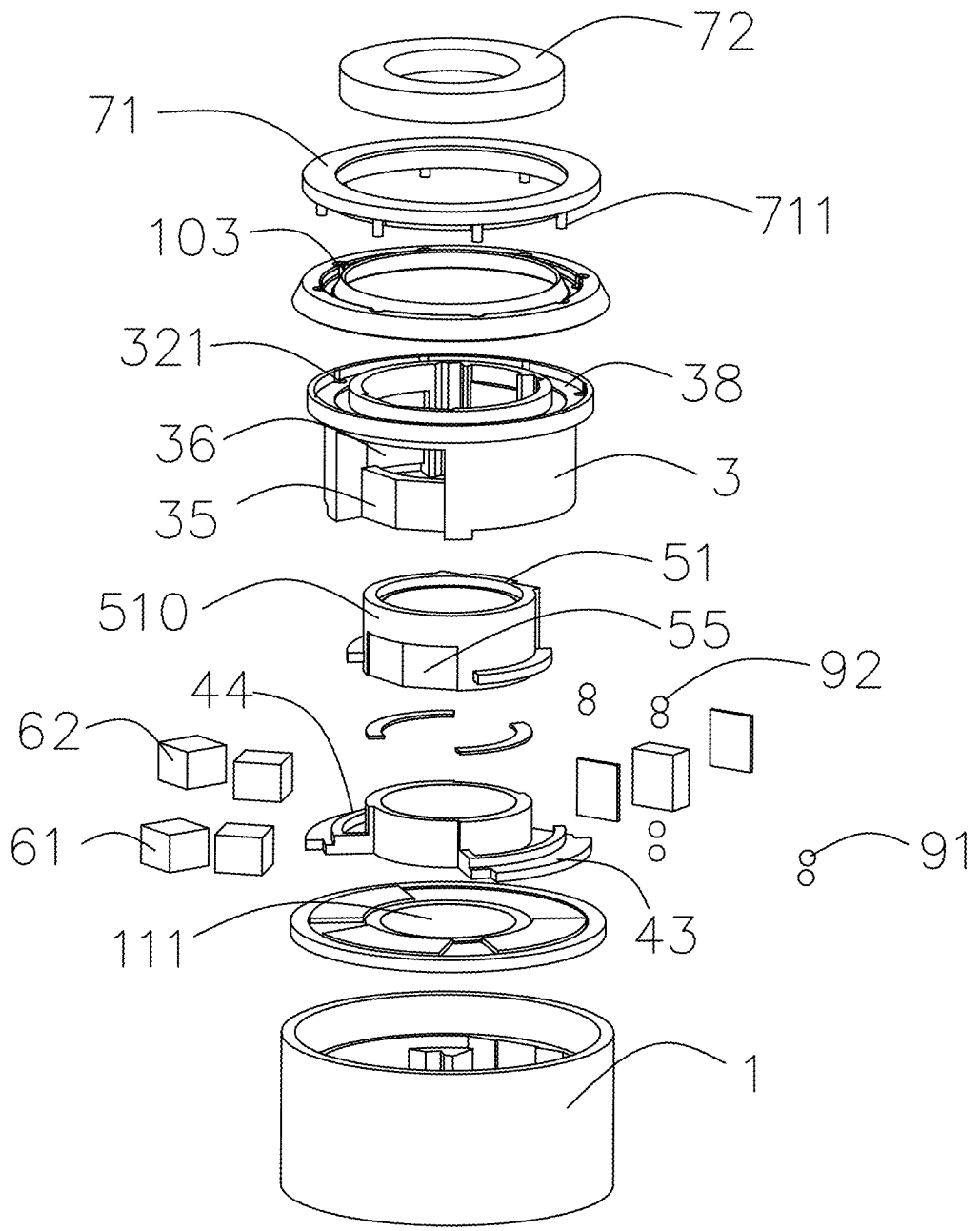
FIG. 7 is an exploded view of the zoom lens module shown in FIG. 1.

The technical solutions in the embodiments of the present disclosure will be described clearly and completely below with reference to the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Referring to FIGS. 1-9, the present disclosure discloses a zoom lens module 100. The zoom lens module 100 has a cylindrical structure as a whole, and includes a casing 1 with an accommodating space 10, a first lens module 2 arranged at a bottom end of the casing 1, a bracket 3 arranged in the accommodation space 10 and slidable relative to the casing 1, a second lens module 4 fixed to the bracket 3, a third lens module 5 arranged in the bracket 3 and slidable relative to the bracket 3, a first driver 61 fixed on the bracket 3 and a second driver 62 fixed on the third lens module 5, a first cover body 71 fixed on a top of the bracket 3 and moving with the bracket 3, and a second cover body 72 fixed on a top of the third lens barrel 5 and moving with the third lens barrel 5.

The casing 1 includes a bottom wall 11 and a side wall 12 extending from the bottom wall 11. The bottom wall 11 and the side wall 12 may be an integral structure or may be assembled separately. The bottom wall 11 is a hollow annular structure, which includes a through hole 111. The first lens module 2 is embedded in the through hole 111, and a lower surface of the first lens module 2 is flush with a lower surface of the bottom wall 11. An inner wall of the side wall 12 of the casing 1 is provided with a first protrusion portion 121 protruding inward, and the first protrusion portion 121 extends horizontally to the accommodating space 10.

The first lens module 2 includes a first lens barrel 21 and a first lens group 22 accommodated in the first lens barrel 21. In the drawings of the present disclosure, labels of the first lens barrel 21 and the first lens group 22 are not specifically shown, and only the first lens module 2 is shown.

The bracket 3 is arranged above the first lens module 2, the bracket 3 is surrounded an accommodating cavity 30, and the second lens module 4 and the third lens module 5 are accommodated insides the accommodating cavity 30. The bracket 3 includes a peripheral wall 31 surrounding the accommodating cavity 30 and a top wall 32 arranged above the peripheral wall 31. The peripheral wall 31 is recessed inward to form a first accommodating groove 33, and both sides of the first accommodating groove 33 are provided with second accommodating grooves 34. A width of the second accommodating grooves 34 is smaller than a width of the first accommodating groove 33, and the width of the second accommodating grooves 34 gradually decreases toward a center of the bracket 3. A first ball 91 is provided between the casing 1 and the bracket 3. The first ball 91 is located in the second accommodating groove 34. A corresponding position of the casing 1 may directly contact the first ball 91, or an accommodating groove may be provided to accommodate the first ball 91. In this embodiment, there are two groups of the first balls 91, each group has two of the first balls, and each of the second accommodating grooves 34 receives the two of the first balls 91. A magnetic steel 81 is arranged in the first accommodating groove 33, and a first magnetic yoke 82 is arranged on the casing 1 at a position corresponding to the magnetic steel 81. An attractive force between the magnetic steel 81 and the first magnetic yoke 82 makes the first ball 91 clamped between the casing 1 and the bracket 3.

The bracket 3 is provided with a third accommodating groove 35 for accommodating the first driver 61 at a position separated from the first accommodating groove 33 and the second accommodating groove 34. A through hole 36 penetrated through the peripheral wall 31 of the bracket and communicated with the receiving cavity 30 is provided above the third accommodating groove 35. The through hole 36 is communicated with the third accommodating groove 35. The first driver 61 is a piezoelectric motor, and the first driver 61 drives the bracket 3 to drive the second lens module 4 and the third lens module 5 to move along the optical axis. The bracket 3, the second lens module 4 and the third lens module 5 move together.

The second lens module 4 includes a second lens barrel 41 and a second lens group 42 accommodated in the second lens barrel 41. An outer wall of the second lens barrel 41 is provided with a second protrusion portion 43 protruding outward. The second protrusion portion 43 extends outward beyond the peripheral wall 31 of the bracket 3. The first protrusion portion 121 and the second protrusion portion 43 of the casing 1 cooperate to limit a common upward movement distance between the second lens module 4 and the third lens module 5. The second protrusion portion 43 of the second lens barrel 41 is further provided with a step portion 44 fixed on the peripheral wall 31 of the bracket 3. A buffer gasket 101 is provided between the bottom wall 11 of the casing 1 and the second lens barrel 41 to reduce an impact between the casing 1 and the second lens barrel 41. The buffer gasket 101 may be fixed on the casing 1, or may also be fixed on the second lens barrel 41.

The third lens module 5 includes a third lens barrel 51 and a third lens group 52 accommodated in the third lens barrel 51. The third lens barrel 51 has an annular wall 510, and the annular wall 510 is provided with a plane portion 53 and first concave portions 54 arranged on both sides of the plane portion 53. A width of each of the first concave portions 54 gradually decreases toward a center of the third lens barrel 51. A second ball 92 is arranged between the bracket 3 and the third lens barrel 51, and the second ball 92 is located in the first concave portions 54. A position corresponding to the bracket 3 may directly contact the second ball 92, or a concave portion may be provided to accommodate the second ball 92. In this embodiment, there are two groups of the second balls 92, each group has two of the second balls, and each of the first concave portions 54 accommodates the two of the second balls 92. A second magnetic yoke 83 is provided on the plane portion 53 of the third lens barrel 51 at a position corresponding to the magnetic steel 81, and an attractive force between the magnetic steel 81 and the second magnetic yoke 83 makes the second balls 92 clamped between the bracket 3 and the third lens barrel 51.

The third lens barrel 51 is provided with a second concave portion 55 at a position spaced from the first concave portion 54 for fixing the second driver 62. The second driver 62 is a piezoelectric motor, which drive the third lens module 5 to move along the direction of the optical axis together. The first driver 61 and the second driver 62 are arranged on the same side of the zoom lens module 100 and the second driver 62 is located above the first driver 61. The second driver 62 partially extends beyond the outside of the bracket 3 through the through hole 36 on the bracket 3.

The top wall 32 of the bracket 3 is provided with a third protrusion portion 37 protruding inward, and the outer wall of the third lens barrel 51 is provided with a fourth protrusion portion 56 protruding outward. The third protrusion portion 37 and the fourth protrusion portion 56 cooperates to limit an upward movement distance of the third lens module 5.

A buffer gasket 102 is provided between the second lens barrel 41 and the third lens barrel 51 to reduce the impact between the second lens barrel 41 and the third lens barrel 51. The buffer gasket 102 may be fixed on the second lens barrel 41, or may also be fixed on the third lens barrel 51.

The top wall 32 of the bracket 3 is provided with an accommodating groove 38. The first cover 71 is in a ring structure and partially accommodated in the accommodating groove 38, and the first cover 71 extends toward the top wall 32 to form a plurality of spaced fixing posts 711. A plurality of fixing holes 321 are provided on the top wall 32 corresponding to the positions of the fixing posts 711. There is a gap between the first cover 71 and the casing 1.

There is a gap between the first cover body 71 and the second cover body 72. The second cover body 72 has an annular structure, and the second cover body 72 is partially extended and accommodated in the third lens barrel 51, and partially extended and accommodated in the accommodating groove 38 of the bracket 3.

The zoom lens module 100 further includes a silicone gasket 103. The silicone gasket 103 includes a main body portion 1031 sandwiched between the bracket 3 and the first cover 71, a first extension portion 1032 extending from the main body portion close to the optical axis and fixed on the second cover body 72, and a second extension portion 1033 extending from the main body portion 1031 away from the optical axis and fixed on the casing 1. The main body 1031 is stepped and fixed by the fixing posts 711 and the fixing holes 321. The fixing posts 711 are inserted into the fixing hole 321 through the main body 1031 of the silicone gasket 103 for fixing. The first extension portion 1032 may be arranged close to the second cover body 72, or a groove structure may be provided on the second cover body to fix the first extension portion 1032, or the first extension portion 1032 may be embedded and fixed on the second cover body 72 when the second cover body 72 is formed. Similarly, the second extension portion 1033 may be arranged close to the side wall 12 of the casing 1, or a groove structure may be provided on the casing 1 to fix the second extension portion 1033, or the second extension portion 1033 is embedded and fixed on the second cover body 72 when molding the casing 1. The silicone gasket 103 can prevent dust and water from entering the zoom lens module 100.

Figure 8:
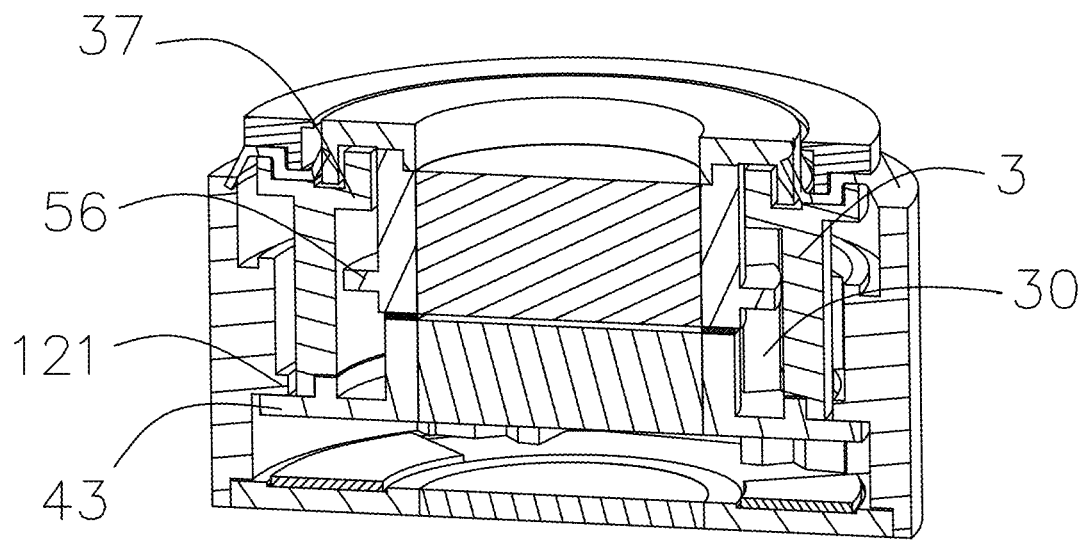
FIG. 8 is a sectional view of the zoom lens module shown in FIG. 1 in a first state.
Figure 9:
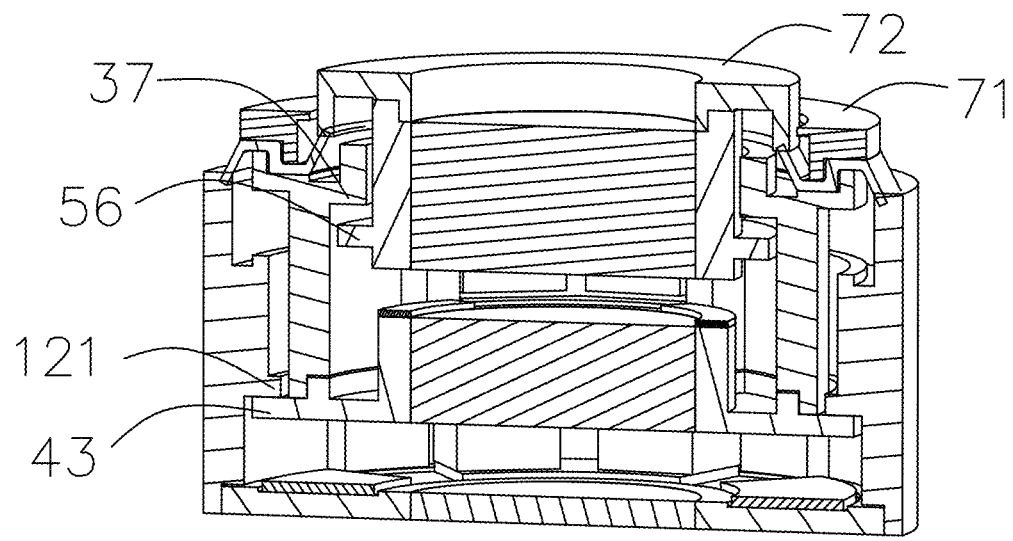
FIG. 9 is a sectional view of the zoom lens module shown in FIG. 1 in a second state.

FIGS. 2-5 are cross-sectional views of the zoom lens module 100 in a stationary state. FIG. 8 is a cross-sectional view of the zoom lens module 100 in a first state, that is, the first driver 61 drives the second lens module 4, the third lens module 5 moves along the optical axis until the first protrusion portion 121 abuts against the second protrusion portion 43. FIG. 9 is a cross-sectional view of the zoom lens module 100 in a second state, that is, in the second state, the second driver 62 in the first state continues to drive the third lens module 5 to move along the optical axis until the third protrusion 37 abuts against the fourth protrusion 56. Of course, the zoom lens module 100 may also only make the second driver 62 drive the third lens module 5 when the second lens module does not move. In this state, only the second driver 62 works.

Compared with the related art, the present disclosure provides a zoom lens module, including a casing with an accommodation space, a first lens module arranged at a bottom end of the casing, a bracket arranged in the accommodation space and slidable relative to the casing, which surrounds an accommodation cavity, a second lens module fixed to the bracket, a third lens module arranged in the accommodation cavity and slidable relative to the bracket, a first driver fixed on the bracket and a second driver fixed on the third lens module. The first lens module, the second lens module, the third lens module are coaxially arranged. The first lens module includes a first lens barrel 21 and a first lens group 22 accommodated in the first lens barrel 21. The second lens module includes a second lens barrel and a second lens group accommodated in the second lens barrel. The third lens module includes a third lens barrel and a third lens group accommodated in the third lens barrel. The first driver drives the bracket, the second lens module and the third lens module to move along a direction of an optical axis, and the second driver drives the third lens module to move along the direction of the optical axis. The zoom lens module of the present disclosure has a simple assembly, a concise structure and a small volume.

Described above are only the embodiments of the present disclosure. It should be pointed out that for those of ordinary skill in the art, improvements may be made without departing from the inventive concept of the present disclosure, but these belong to the protection scope of the present disclosure.

What is claimed is:

1. A zoom lens module, comprising:
   a casing with an accommodation space;
   a first lens module arranged at a bottom end of the casing;
   a bracket arranged in the accommodation space and slidable relative to the casing, wherein the bracket surrounds an accommodation cavity;
   a second lens module fixed to the bracket;
   a third lens module arranged in the accommodation cavity and slidable relative to the bracket;
   a first driver fixed on the bracket; and
   a second driver fixed on the third lens module;
   wherein the first lens module, the second lens module, the third lens module are coaxially arranged; the first lens module comprises a first lens barrel and a first lens group accommodated in the first lens barrel; the second lens module comprises a second lens barrel and a second lens group accommodated in the second lens barrel; the third lens module comprises a third lens barrel and a third lens group accommodated in the third lens barrel; the first driver drives the bracket, the second lens module and the third lens module to move along a direction of an optical axis, and the second driver drives the third lens module to move along the direction of the optical axis;
   wherein the casing comprises a bottom wall and a side wall extending from the bottom wall, and a buffer gasket is provided between the bottom wall and the second lens barrel, and/or a buffer gasket is provided between the second lens barrel and the third lens barrel.

2. The zoom lens module of claim 1, wherein the first driver and the second driver are piezoelectric motors.

3. The zoom lens module of claim 1, wherein the first driver and the second driver are arranged on a same side of the zoom lens module.

4. The zoom lens module of claim 1, wherein a first ball is provided between the casing and the bracket, and a second ball is provided between the bracket and the third lens barrel.

5. The zoom lens module of claim 4, wherein a magnetic steel is fixed on the bracket, a first magnetic yoke is fixed on the casing, and a second magnetic yoke is fixed on the third lens barrel; an attractive force between the magnetic steel and the first magnetic yoke makes the first ball clamped between the casing and the bracket, and an attractive force between the magnetic steel and the second magnetic yoke makes the second ball clamped between the bracket and the third lens barrel.

6. The zoom lens module of claim 1, wherein an inner wall of the casing is provided with a first protrusion portion protruding inward, an outer wall of the second lens barrel is provided with a first protrusion portion protruding outward, and the first protrusion portion and the second protrusion portion cooperate to limit a common upward movement distance between the second lens module and the third lens module.

7. The zoom lens module of claim 1, wherein the bracket is provided with a third protrusion portion protruding inward, an outer wall of the third lens barrel is provided with a fourth protrusion portion protruding outward, and the third protrusion portion and the fourth protrusion portion cooperate to limit an upward movement distance of the third lens module.

8. The zoom lens module of claim 1, further comprising:
   a first cover body fixed on a top of the bracket and moving with the bracket; and
   a second cover body fixed on a top of the third lens barrel and moving with the third lens barrel.

9. The zoom lens module of claim 8, further comprising:
   a silicone gasket, comprising:
   a main body sandwiched between the bracket and the first cover part;
   a first extension portion extending from a side of the main body part close to the optical axis and fixed on the second cover body; and
   a second extension portion extending from a side of the main body part away from the optical axis and fixed on the casing.

* * * * *